United States Patent
Liu et al.

(10) Patent No.: US 12,117,829 B1
(45) Date of Patent: Oct. 15, 2024

(54) AUTONOMOUS VEHICLE REMOTE CONTROL APPARATUS AND METHOD BASED ON HETEROGENEOUS NETWORKS

(71) Applicant: ZHEJIANG LAB, Zhejiang (CN)

(72) Inventors: Yuntao Liu, Hangzhou (CN); Yongdong Zhu, Hangzhou (CN); Zhifeng Zhao, Hangzhou (CN); Wei Hua, Hangzhou (CN); Qian Huang, Hangzhou (CN); Shuyuan Zhao, Hangzhou (CN); Daoxun Li, Hangzhou (CN); Zimian Wu, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/505,068

(22) Filed: Nov. 8, 2023

Related U.S. Application Data

(63) Continuation of application No. PCT/CN2023/099451, filed on Jun. 9, 2023.

(30) Foreign Application Priority Data

Apr. 10, 2023 (CN) .......................... 202310373045.2

(51) Int. Cl.
*G05D 1/00* (2024.01)
*B60W 60/00* (2020.01)
*H04L 67/12* (2022.01)

(52) U.S. Cl.
CPC .......... *G05D 1/0022* (2013.01); *B60W 60/00* (2020.02); *H04L 67/12* (2013.01); *B60W 2556/45* (2020.02)

(58) Field of Classification Search
CPC ................ G05D 1/0022; B60W 60/00; B60W 2556/45; H04L 67/12
See application file for complete search history.

(56) References Cited

U.S. PATENT DOCUMENTS

| | | | |
|---|---|---|---|
| 2015/0185034 A1 | 7/2015 | Abhyanker | |
| 2016/0057122 A1* | 2/2016 | van Bergeijk | H04W 12/04 |
| | | | 713/168 |

(Continued)

FOREIGN PATENT DOCUMENTS

| | | |
|---|---|---|
| CN | 109034391 A | 12/2018 |
| CN | 109151034 A | 1/2019 |

(Continued)

OTHER PUBLICATIONS

International Search Report (PCT/CN2023/099451); Date of Mailing: Aug. 12, 2023.

(Continued)

*Primary Examiner* — Jean Paul Cass
*Assistant Examiner* — Alexander George Matta
(74) *Attorney, Agent, or Firm* — W&G Law Group

(57) ABSTRACT

The present disclosure discloses an autonomous vehicle remote control apparatus and a method based on heterogeneous networks. The apparatus comprises a vehicle information acquisition module, a first message sending module, a first message receiving module and a first remote control module. According to the present disclosure, the possibility of failure of remote control is avoided or greatly reduced by bypassing the area where the network quality does not support remote control when planning a vehicle path, heterogeneous network resources are reasonably utilized on the vehicle driving path, the real-time performance of obtaining vehicle-related information by a remote control terminal is improved, and the availability and reliability of remote control and the safety of vehicle driving are effectively enhanced.

13 Claims, 5 Drawing Sheets

(56) References Cited

U.S. PATENT DOCUMENTS

| | | | | |
|---|---|---|---|---|
| 2016/0134994 | A1* | 5/2016 | Kellner | H04L 67/12 |
| | | | | 370/329 |
| 2018/0157251 | A1* | 6/2018 | Cole | H04B 1/69 |
| 2019/0317491 | A1* | 10/2019 | Kobayashi | G06V 20/56 |
| 2019/0354111 | A1* | 11/2019 | Cheng | G05D 1/0011 |
| 2020/0015111 | A1* | 1/2020 | Martinez | H04L 67/12 |
| 2020/0041994 | A1* | 2/2020 | Alalao | H04W 4/40 |
| 2022/0053607 | A1 | 2/2022 | Rice et al. | |

FOREIGN PATENT DOCUMENTS

| | | | |
|---|---|---|---|
| CN | 110381468 | A | 10/2019 |
| CN | 110933638 | A | 3/2020 |
| CN | 111464973 | A | 7/2020 |
| CN | 112461256 | A | 3/2021 |
| CN | 113228714 | A | 8/2021 |
| CN | 114509083 | A | 5/2022 |
| CN | 115022834 | A | 9/2022 |
| CN | 115150970 | A | 10/2022 |
| CN | 115567896 | A | 1/2023 |
| CN | 115696511 | A | 2/2023 |
| CN | 116088401 | A | 5/2023 |
| EP | 3322204 | A1 * | 5/2018 ............ H04W 4/046 |
| WO | 2017100473 | A1 | 6/2017 |
| WO | 2019064542 | A1 | 4/2019 |
| WO | 2022094584 | A1 | 5/2022 |

OTHER PUBLICATIONS

First Office Action(CN202310373045.2); Date of Mailing: May 16, 2023.

Notice Of Allowance(CN202310373045.2); Date of Mailing: May 31, 2023.

Network-Handoff-Technologies-and-Applications-in-the-Internet-of-Vehicles.

Method-of-Mobility-Management-for-Heterogeneous-V2X-Network-and-the-Implement-of-V2X-Simulation-Platform.

Heterogeneous-Vehicular-Network-Model-and-Handoff-Method-with-Varying-Network-Performance.

Research-on-train-network-quality-improvement(machine translation).

* cited by examiner

AUTONOMOUS VEHICLE REMOTE CONTROL APPARATUS AND METHOD BASED ON HETEROGENEOUS NETWORKS

CROSS-REFERENCE TO RELATED APPLICATIONS

The present application is a continuation of International Application No. PCT/CN2023/099451, filed on Jun. 9, 2023, which claims priority to Chinese Application No. 202310373045.2, filed on Apr. 10, 2023, the contents of both of which are incorporated herein by reference in their entireties.

TECHNICAL FIELD

The present disclosure relates to the technical field of artificial intelligence, in particular to the fields of autonomous driving and intelligent networks, and in particular to a method and an apparatus for remote control of an autonomous vehicle based on heterogeneous networks.

BACKGROUND

Due to the abnormal system of autonomous vehicles, vehicle failures and complicated driving environment that cannot be handled, all autonomous vehicles now require safety officers to ensure that they can be taken over in these special circumstances. However, if each vehicle is equipped with a safety officer, especially in autonomous driving scenarios within some specific areas, such as autonomous driving in scenic areas, autonomous driving in mined areas, and autonomous driving in special road sections such as ports, industrial parks, mountainous areas, and high-risk environments, it will lead to an increase in labor costs, as well as a waste of personnel and low work efficiency. Therefore, in view of the autonomous driving scenarios in specific areas, the reconstruction of the vehicle driving environment can be realized by building a dedicated remote control system, so that the safety officer can follow the state and surrounding environment of the vehicle at the remote control terminal as if they were in an actual vehicle, remotely take over the vehicle if necessary, and control the vehicle to resume normal driving or engage in remote driving. In addition, the safety officer at the remote control terminal can supervise multiple vehicles simultaneously, thereby effectively saving human resources. Furthermore, because the safety officer at the remote control terminal does not need to be in the physical environment where the actual vehicle is located, work efficiency and own safety can also be improved for driving operations in some high-risk environments.

In order to ensure the reliability of remote control, the state of the autonomous vehicle and the surrounding environment information need to be transmitted in real time to the remote control terminal through a network. Because the environmental information around the vehicle mainly includes the video data captured by the vehicle-mounted cameras and/or the environmental sensing information obtained by other vehicle-mounted sensing devices, the data amount of the sensing information is large. Real-time sensing data transmission has certain requirements for the network environment in which the autonomous vehicle is located. The 5G R16 standard of 3GPP defines the network communication requirements for remote driving services, which requires the transmission delay of 5 ms, the reliability of 99.99%, the uplink rate of 25 Mbps, and the downlink rate of 1 Mbps. At present, the existing researches such as the published patents CN 113805515 A "Vehicle Remote Control Method and Device, Equipment, Storage Medium and Remote Cockpit", CN 113741223 A "Vehicle Remote Control Method, Device and Equipment, Medium and Automatic Driving Vehicle" and CN 115390484 A "Vehicle Remote Control Method and Device, Electronic Equipment and Storage Medium" all assume that the network meets the requirements of remote driving services. However, in the actual scenarios, a single network, such as the 4/5G public network deployed by the operator or the Wi-Fi deployed by the enterprise itself or the 4/5G private network, always has blind spots or areas that cannot fully satisfy remote control. Therefore, how to design an autonomous vehicle remote control method based on heterogeneous networks has become an urgent technical problem.

SUMMARY

In view of the shortcomings of the prior art, the present disclosure provides autonomous vehicle remote control apparatus and method based on heterogeneous networks.

In a first aspect, the present disclosure provides an autonomous vehicle remote control apparatus based on heterogeneous networks, which is applied to an autonomous vehicle and includes:
  a vehicle information acquisition module configured to acquire vehicle state information, vehicle position information, vehicle surrounding environment information provided by vehicle-mounted sensing devices, and an available network list of the autonomous vehicle;
  a first message sending module configured to generate a corresponding message according to the state of the autonomous vehicle, and send the corresponding message to the remote control terminal through a corresponding network in the available network list;
  a first message receiving module configured to monitor different network ports according to the state of the autonomous vehicle, receive remote control messages sent by the remote control terminal, filter and merge the remote control messages, and forward a merged message to the first remote control module; and
  the first remote control module configured to receive the merged message from the first message receiving module, and respond to a remote control command contained in the merged message to realize remote control of the autonomous vehicle.

In a second aspect, the present disclosure provides an autonomous vehicle remote control apparatus based on heterogeneous networks, which is applied to a remote control terminal and includes:
  a network information acquisition module configured to acquire the available network list in a designated area and a network quality of a corresponding network;
  a path planning module configured to plan an optimal driving path for the autonomous vehicle according to a starting point and an ending point of the autonomous vehicle in a case that the network quality of the designated area is known, where the network quality on the optimal driving path supports remote driving as much as possible;
  a second message receiving module configured to receive messages sent by the autonomous vehicle, filter and merge the messages, and forward a merged message to a second remote control module;

the second remote control module configured to receive the merged message from the second message receiving module, and generate a corresponding remote control command according to information contained in the merged message; and a second message sending module configured to generate a corresponding message according to the remote control command generated by the second remote control module, and send the corresponding message to the autonomous vehicle through a corresponding network in the available network list.

In a third aspect, the present disclosure provides an autonomous vehicle remote control method based on heterogeneous networks, which is applied to an autonomous vehicle and includes:

S101, after the autonomous vehicle is started, searching for available networks and connecting the available networks, selecting an available network as a first network to send and receive information at present, and receiving a remote driving start message sent by a remote control terminal;

S102, obtaining, by the autonomous vehicle, pre-driving area information including path planning information of the autonomous vehicle in a pre-driving area and heterogeneous network information of the pre-driving area sent by the remote control terminal through the first network, autonomously driving according to a planned path, and generating and maintaining an available network list according to the heterogeneous network information;

S103, during driving of the autonomous vehicle, selecting an appropriate network or a network combination to send a vehicle operating message to the remote control terminal, and monitoring remote control messages sent by the remote control terminals on all heterogeneous networks; and S104, after the remote control messages are processed, responding, by the autonomous vehicle, to a remote control command sent by the remote control terminal.

In the fourth aspect, the present disclosure provides an autonomous vehicle remote control method based on heterogeneous networks, which is applied to a remote control terminal, and the method includes the following steps:

S201, sending, by the remote control terminal, a remote driving start message to an autonomous vehicle through a network port by which a vehicle start message is received;

S202, obtaining, by the remote control terminal, heterogeneous network quality information of areas corresponding to a destination and a position of the autonomous vehicle, planning an optimal driving path for the autonomous vehicle, where network quality on the optimal driving path supports remote driving as much as possible, encapsulating path information of a pre-driving area and corresponding heterogeneous network quality information into a pre-driving area message, and sending the pre-driving area message to the autonomous vehicle through a network used by the autonomous vehicle; and S203, receiving, by the remote control terminal, a vehicle operating message sent by the autonomous vehicle, merging received vehicle operating information, extracting complete and effective information, generating a remote control command according to a requirement, encapsulating the remote control command, and generating a remote control message to sent to the autonomous vehicle.

The present disclosure has the following beneficial effects:

the method and apparatus for remote control of an autonomous vehicle based on heterogeneous networks provided by the present disclosure effectively utilize heterogeneous network resources, bypass areas where network quality does not support remote driving during vehicle path planning, avoid or greatly reduce the probability that autonomous driving is abnormal and cannot take over control remotely in time, and improve the availability and reliability of remote control; furthermore, the heterogeneous network resources are reasonably used on the vehicle driving path, which improves the real-time sensing of the vehicle surrounding environment and vehicle state information by the remote driving terminal, and further improves the driving safety and reliability.

BRIEF DESCRIPTION OF DRAWINGS

The present disclosure will be further described in detail with the attached drawings and examples.

DESCRIPTION OF EMBODIMENTS

The object and effect of the present disclosure will become more apparent by describing the present disclosure in detail according to the attached drawings and preferred embodiments. It should be understood that the specific embodiments described here are only for explaining the present disclosure and are not used to limit the present disclosure.

Figure 1:
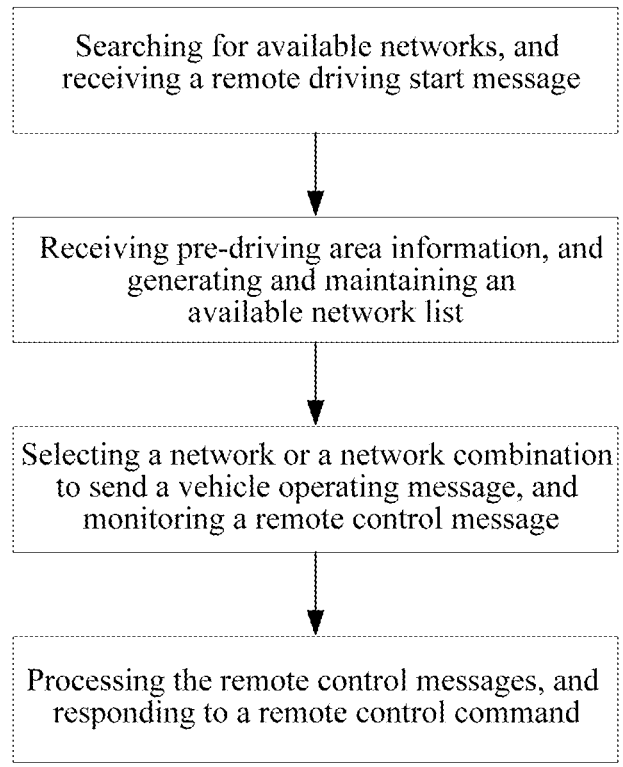
FIG. 1 is a flowchart of an autonomous vehicle remote control method provided by an embodiment of the present disclosure.

As shown in FIG. 1, an autonomous vehicle remote control method based on heterogeneous networks provided by an embodiment of the present disclosure is applied to autonomous vehicles, and the method includes the following steps:

S101: after an autonomous vehicle is started, available networks are searched and connected, an available network is selected as a first network to send and receive information at present, and a remote driving start message sent by a remote control terminal is received.

As one of the embodiments, S101 is realized by the following sub-steps:

(1) After the autonomous vehicle is started, the available networks are autonomously searched through a preset network profile. Available networks include, but are not limited to, 4/5G wireless networks, WiFi networks, and specific private networks. In order to reduce the time of network search, the network profile will autonomously save the network information of the last successful access, and give priority to the network of the last successful access during network search. Once an available network is successfully searched, the autonomous vehicle autonomously accesses this network. Furthermore, in view of the existence of multiple available heterogeneous networks, the vehicle will be connected to multiple different networks for the sake of network redundancy.

(2) Among a plurality of available heterogeneous networks, the autonomous vehicle selects an available network as the first network to send information at present. An optional way is to test and verify the network qualities of heterogeneous networks, and the network with the best network quality is the first network; another alternative is to designate an available network as the first network in the preset profile; in addition, another alternative way is to use the first network successfully accessed as the first network. The present disclosure also supports other ways to select the first available network.

(3) The autonomous vehicle actively reports the vehicle start message to the remote control terminal, which includes the vehicle identification, vehicle state information and vehicle position information. If the first network used by the vehicle is different, the corresponding sending port of the message is different, and the corresponding receiving port is also different. Therefore, the receiving end can judge the first network currently used by the autonomous vehicle according to the port information.

(4) The autonomous vehicle monitors the remote driving start message containing the driving destination and departure time sent from the remote control terminal. Before receiving the remote driving start message, the autonomous vehicle may receive the remote control message sent by the remote control terminal. Remote control messages are in-vehicle control commands, such as the opening or closing of windows and doors, and the setting of in-vehicle air conditioners. For the in-vehicle control commands, the autonomous vehicle forwards the related commands to the corresponding control module; for the remote driving start message, the autonomous vehicle will enter the remote driving mode upon receiving the message. For the in-vehicle control commands, since they do not involve the driving behavior of the vehicle, the autonomous vehicle directly skips to S104. Because the vehicle will also receive the in-vehicle control commands during the remote driving process, the present disclosure will be described in view of a complete remote driving process in detail for the sake of the integrity of the method.

S102: the autonomous vehicle obtains pre-driving area information, including the path planning information of the autonomous vehicle in the pre-driving area and the heterogeneous network information of the pre-driving area sent by the remote control terminal, through the first network, autonomously drives according to the planned path, and generates and maintains an available network list according to the heterogeneous network information.

As one of the embodiments, S102 is realized by the following sub-steps:

(1) An autonomous vehicle monitors a pre-driving area message sent by a remote control terminal through a first network. The pre-driving area message contains the path planning information of the autonomous vehicle in the pre-driving area and the heterogeneous network information of the pre-driving area. The network quality information includes the heterogeneous network quality in the pre-driving area, specifically the heterogeneous network quality supporting the autonomous vehicle, such as the network quality of 4/5G, the network quality of WiFi network and the network quality of specific private networks. Furthermore, the 4/5G network quality can be subdivided into the network quality corresponding to a specific telecom operator. There is not any restriction on the number and types of supported heterogeneous networks in the present disclosure.

(2) The autonomous vehicle analyzes the pre-driving area message, and verifies the path planning information of the pre-driving area and the corresponding heterogeneous network information respectively. For path planning information, only the integrity of path planning information is verified; for heterogeneous network information, it is necessary to ensure that the autonomous vehicle has at least one available network.

(3) The autonomous vehicle generates and maintains an available network list according to the received network quality information of the pre-driving area path. Further, the autonomous vehicle obtains the network quality of the driving area from the network quality information, sorts the available heterogeneous network qualities according to the network quality information, and selects an optimal network as the first network; other networks are the second network, the third network and so on in an order of quality. The first network, the second network, the third network and other networks form an available network list of the autonomous vehicle.

(4) The autonomous vehicle sends a pre-driving area information confirmation message to the remote control terminal, and enters the autonomous driving mode.

S103: when the autonomous vehicle is driving, an appropriate network or a network combination is selected to send the vehicle operating message to the remote control terminal, and the remote control messages sent by the remote control terminals on all heterogeneous networks are monitored.

As one of the embodiments, S103 is realized by the following sub-steps:

(1) The autonomous vehicle periodically collects current vehicle state information, vehicle position information and vehicle surrounding environment information. Furthermore, the collection period of each information is not restricted in the present disclosure.

(2) The autonomous vehicle generates vehicle operating messages. The vehicle operating message includes one of vehicle state information, vehicle position information and vehicle surrounding environment information. Optionally, the present disclosure supports that the vehicle state information, the vehicle position information and the vehicle surrounding environment information have the same or different transmission frequencies. Further, different transmission priorities are set for the three types of information. Among them, the vehicle state information has the first priority, vehicle position information is the second priority, and vehicle surrounding environment information is the third priority. If two or three types of information are sent at the same time, according to the different priorities, the information with a higher priority is preferentially encapsulated in the vehicle operating message for sending.

(3) The autonomous vehicle selects an appropriate network or a network combination to send the vehicle operating message to the remote control terminal. For the transmission of vehicle operating messages, the first network is preferentially used for transmission; if the maximum width of the first network is reached, but there are still unsent messages or partial data of messages, the remaining messages or data are sent by using the second network, and so on until all messages are sent or the networks in the available network list are used up.

(4) The remote control terminal receives the vehicle operating message sent by the autonomous vehicle, and sends the corresponding remote control command to the vehicle according to the received information. The autonomous vehicle monitors the remote control command sent by the remote driving control terminal. In the normal autonomous driving process, if the state and position of the vehicle are normal and there is no special environment around the vehicle, for the purpose of reducing the network bandwidth, the remote control terminal may not need to send remote control messages to the autonomous vehicle. Therefore, under normal circumstances, the autonomous vehicle only needs to continuously monitor whether there is a remote control message sent by the remote driving control terminal. Considering the complexity of the network and the reliability of remote control, the autonomous vehicle needs to monitor all heterogeneous networks, that is, the first network, the second network, the third network, etc., to prevent the failure of remote control due to the abnormality of a single network and improve the robustness of remote control.

S104: after processing the remote control message, the autonomous vehicle responds to the remote control command sent by the remote control terminal.

As one of the embodiments, S104 is realized by the following sub-steps:

(1) The autonomous vehicle comprehensively processes the remote control messages from multiple networks. For the remote control messages from different networks with the same remote message identification, the autonomous vehicle regards them as the same remote control command, and if it has already responded, there is no need to repeat the response.

(2) The autonomous vehicle sends a relevant remote control command to the first remote control module to realize remote control.

(3) The autonomous vehicle will send a control command execution response message to the remote control terminal through the first network to realize the closed loop of the whole remote control process.

Figure 2:
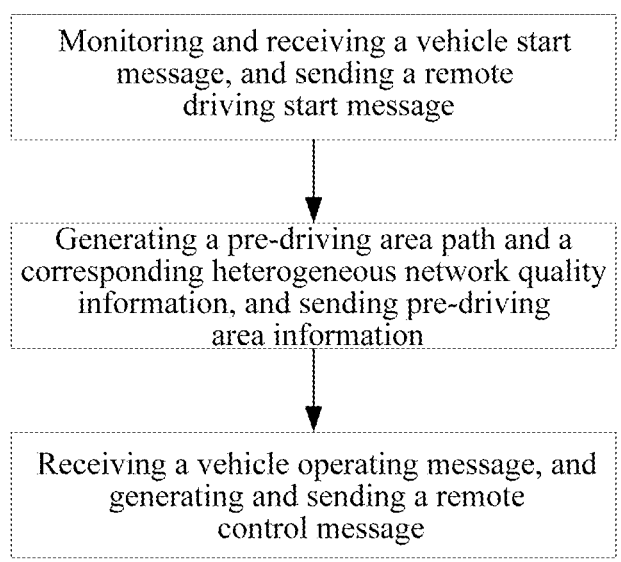
FIG. 2 is a flowchart of another autonomous vehicle remote control method provided by an embodiment of the present disclosure.

FIG. 2 is an autonomous vehicle remote control method based on heterogeneous networks provided by an embodiment of the present disclosure, which is applied to a remote control terminal, and the method includes the following steps:

S201: the remote control terminal sends a remote driving start message to the autonomous vehicle through a network port where the vehicle start message is received.

As one of the embodiments, S201 is realized by the following sub-steps:

(1) The remote control terminal monitors a specific network port and receives a vehicle start message from the autonomous vehicle. Furthermore, through the network port where the vehicle start message is received, the remote control terminal can determine the first network used by the autonomous vehicle.

(2) According to the received vehicle start message, a remote driving start message is sent to the autonomous vehicle. Furthermore, before sending the remote driving start message, the remote control terminal can send remote control messages containing in-vehicle control commands, such as the opening or closing of windows and doors, the setting of in-vehicle air conditioners and the like to the autonomous vehicle as needed. When it is judged that the autonomous vehicle needs remote driving start, a remote driving start message including the driving destination and the departure time is sent. The remote control terminal sends the remote control message and the remote driving start message to the autonomous vehicle through the first network used by the autonomous vehicle.

S202: the remote control terminal obtains the heterogeneous network quality information of the area corresponding to the position and destination of the autonomous vehicle, plans the optimal driving path for the autonomous vehicle, the network quality on the optimal driving path supporting remote driving as much as possible, and encapsulates the path information of the pre-driving area and the corresponding heterogeneous network quality information into a pre-driving area message, which is sent to the autonomous vehicle through the network used by the autonomous vehicle.

As one of the embodiments, S202 is realized by the following sub-steps:

(1) The remote control terminal makes path planning for the autonomous vehicle in advance according to the reported position and corresponding destination of the autonomous vehicle. The remote control terminal obtains the heterogeneous network quality information of the areas corresponding to the position and destination of the autonomous vehicle. Furthermore, the corresponding heterogeneous network quality information may be the previously stored historical network quality information, the network information collected and reported by other vehicles in the current or historical period, or the network information provided by a third party. The present disclosure does not limit the source and production mode of heterogeneous network quality information.

(2) According to the corresponding heterogeneous network quality information, the remote control terminal plans the corresponding pre-driving area path for the autonomous vehicle. Furthermore, when planning the path of the pre-driving area, the remote control terminal autonomously avoids the area where the network quality is not enough to support remote control, and tries to ensure that the network quality of the area where the pre-driving area path is located meets the requirements of remote control, so as to improve the availability and reliability of remote control.

(3) Once the pre-driving area path is determined, the remote control terminal extracts the heterogeneous network quality information of the pre-driving area path for the autonomous vehicle, and encapsulates the pre-driving area path information and the corresponding heterogeneous network quality information into a pre-driving area message.

(4) The remote control terminal sends the pre-driving area message to the autonomous vehicle through the first network used by the autonomous vehicle. After sending all the pre-driving area path information and the corresponding heterogeneous network quality information, the remote control terminal monitors the receiving port corresponding to the first network used by the autonomous vehicle. Once a pre-driving area information confirmation message is received, it is considered that the autonomous vehicle begins to enter the autonomous driving mode.

S203: the remote control terminal receives the vehicle operating message sent by the autonomous vehicle, merges the received information, extracts complete and effective information, generates a remote control command as required, and encapsulates to generate a remote control message to be sent to the autonomous vehicle.

As one of the embodiments, S203 specifically includes the following steps:

(1) The remote control terminal monitors the corresponding network port and receives the vehicle operating message sent by the autonomous vehicle. Further, the remote control terminal judges the position of the autonomous vehicle in a certain period of time in advance through the vehicle position information and vehicle state information sent by the autonomous vehicle previously, and learns the network usage of the first network and the second network used by the current vehicle from the heterogeneous network information through the position information, so as to monitor the corresponding network ports.

(2) The remote control terminal analyzes the received vehicle operating message and extracts the corresponding vehicle state information, vehicle position information and vehicle surrounding environment information. Furthermore, the remote control terminal may receive multiple messages containing different information in a period of time, and at the same time, some information may be split in different messages and sent through the same or different networks, therefore, the remote control terminal needs to merge the received messages to extract the complete information. For example, as for the information about the surrounding environment of the vehicle, since the original perceived data obtained from the sensing device of the autonomous vehicle is very large, such as the video data of the camera, the bandwidth of a single network may not support the real-time transmission of the corresponding data, therefore it needs to be split and transmitted in multiple networks. Correspondingly, the remote control terminal needs to merge the split data to obtain complete and effective information.

(3) The remote control terminal comprehensively analyzes the vehicle state information, vehicle position information and vehicle surrounding environment information, so as to obtain the current operating state of the autonomous vehicle, such as whether the current autonomous driving state of the vehicle is normal, whether the path trajectory is normal, whether the vehicle state has an alarm, whether the surrounding driving environment is complex, etc.

(4) The remote control terminal judges whether the vehicle needs remote control according to the operating state of the autonomous vehicle. Only in a scene where the remote control terminal needs to take over driving or assist driving and in-vehicle non-driving control (such as window control and in-vehicle air conditioning setting, etc.), the remote control terminal will generate corresponding remote control commands. Furthermore, since the autonomous vehicle is in a normal autonomous driving process, the remote control terminal does not need to perform remote control in most cases. However, if the autonomous vehicle has not received the message from the remote control terminal for a long time, it is difficult to distinguish whether it is caused by the abnormality of the remote control terminal or remote control is actually not needed. Therefore, an alternative method is to generate a heartbeat remote control command when there is no remote control command generated at the remote control terminal within a certain period of time. The heartbeat remote control command is only used to prove that the remote control terminal is still in a normal working state. When the autonomous vehicle receives the heartbeat remote control command, it does not need to respond.

(5) The remote control terminal encapsulates the remote control command and generates a corresponding remote control message. Furthermore, the remote control terminal sets different priorities for different remote control messages. The priority of the remote control message is the priority of the contained control command. The control commands are divided into in-vehicle control commands and driving commands. The in-vehicle control commands include remote control of the interior of the vehicle, such as the opening or closing of windows and doors, the setting of in-vehicle air conditioners, the setting of in-vehicle entertainment facilities, etc.; the driving commands include remote control of vehicle driving, such as changing driving trajectory, driving speed/acceleration, driving direction angle, pulling over, changing lanes, overtaking, etc. The priority of driving commands is higher than that of in-vehicle control commands. For the details and corresponding priorities of specific control commands, the present disclosure does not make further restrictions, nor does it belong to the focus of the present disclosure.

(6) The remote control terminal sends the corresponding remote control message to the autonomous vehicle. For high-priority remote control messages, such as control commands for emergency parking, for the sake of driving safety, the remote control terminal will send remote control messages with the same identification in all heterogeneous networks supported by autonomous vehicles, so as to ensure that autonomous vehicle can receive corresponding control messages through any network and improve the remote control response speed of the autonomous vehicle. For low-priority remote control messages, such as messages containing control commands for in-vehicle air conditioners, they are sent through the first network of autonomous vehicle is used to save network bandwidth.

Figure 3:
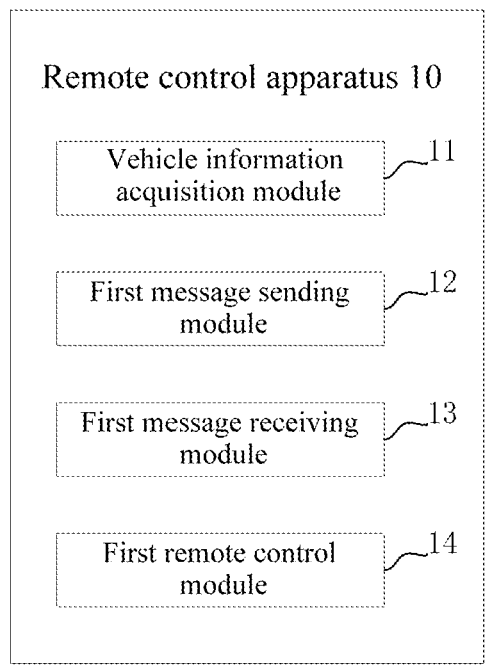
FIG. 3 is a structural block diagram of an autonomous vehicle remote control apparatus provided by an embodiment of the present disclosure.

FIG. 3 is an autonomous vehicle remote control apparatus based on heterogeneous networks, which is applied to autonomous vehicles. The remote control apparatus 10 includes a vehicle information acquisition module 11, a first message sending module 12, a first message receiving module 13 and a first remote control module 14, which are specifically as follows:

the vehicle information acquisition module 11 is used to acquire vehicle state information, vehicle position information, vehicle surrounding environment information provided by vehicle-mounted sensing devices and an available network list of the autonomous vehicle;

the first message sending module 12 is used to generate a corresponding message according to a state of the autonomous vehicle and send the corresponding message to the remote control terminal through a corresponding network in the available network list;

the first message receiving module 13 is used to monitor different network ports according to the state of the autonomous vehicle, receive remote control messages sent by the remote control terminal, filter and merge the remote control messages and forward the messages to a first remote control module; and the first remote control module 14 is used to receive the messages from the first message receiving module and respond to a remote control command contained in the message to realize the remote control of the autonomous vehicle.

Figure 4:
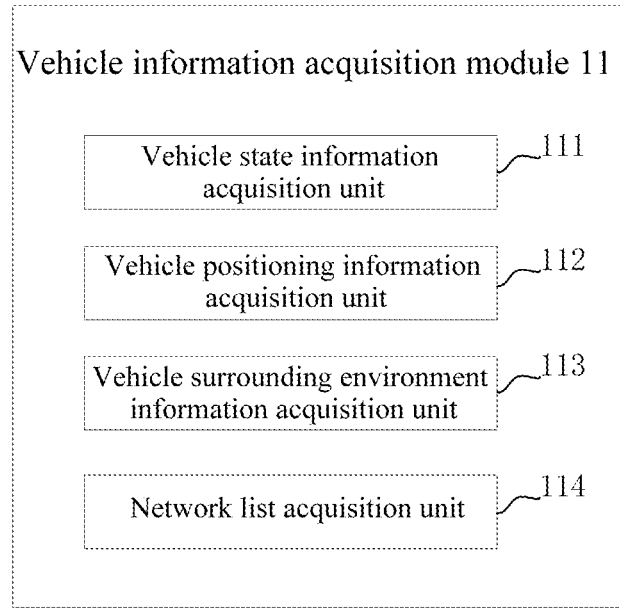
FIG. 4 is a structural block diagram of a vehicle information acquisition module provided by an embodiment of the present disclosure.

Further, as shown in FIG. 4, the vehicle information acquisition module 11 includes:
- a vehicle state information acquisition unit 111 used to acquire the vehicle state information from an autonomous driving system of the autonomous vehicle;
- a vehicle positioning information acquisition unit 112 used to acquire current vehicle position information from the autonomous driving system of the autonomous vehicle and send the corresponding positioning information to a network list acquisition unit;
- a vehicle surrounding environment information acquisition unit 113 used to acquire vehicle surrounding environment information from the autonomous driving system of the autonomous vehicle; and
- the network list acquisition unit 114 used to acquire the current vehicle position information from the vehicle positioning information acquisition unit, and generate and maintain the available network list according to network quality information.

Figure 5:
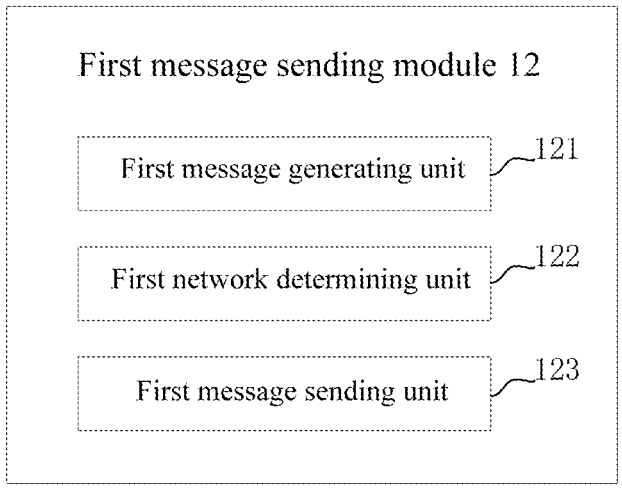
FIG. 5 is a structural block diagram of a first message sending module provided by an embodiment of the present disclosure.

Further, as shown in FIG. 5, the first message sending module 12 includes:
- a first message generating unit 121 used to generate a corresponding message according to a state of the autonomous vehicle;
- a first network determining unit 122 used to determine a sending network for the message to be sent according to a type of the message to be sent and the current available network list; and
- a first message sending unit 123 used to send the message to be sent through the corresponding sending network, including copying the message and splitting the message.

Figure 6:
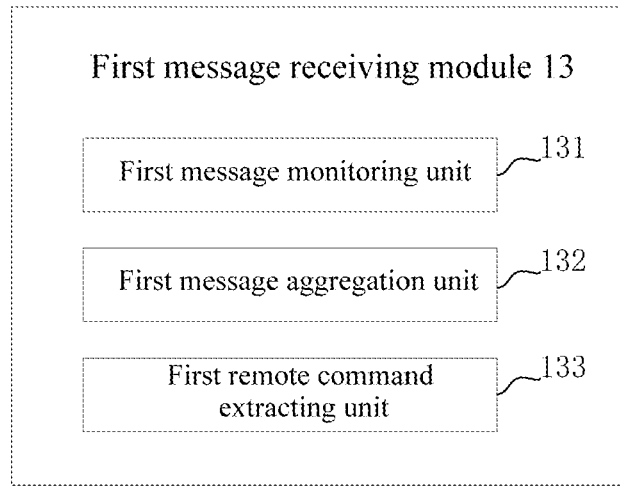
FIG. 6 is a structural block diagram of a first message receiving module provided by an embodiment of the present disclosure.

Further, as shown in FIG. 6, the first message receiving module 13 includes:
- a first message monitoring unit 131 used to monitor corresponding network ports in the available network list and send monitored messages to a first message aggregation unit;
- the first message aggregation unit 132 used to aggregate the monitored messages, filter same messages from different networks to reduce the repeated execution of the remote control command; and
- a first remote command extracting unit 133 used to process the received remote control message, extract the corresponding remote control command, and preferentially send the remote control command with a high priority to the first remote control module.

Figure 7:
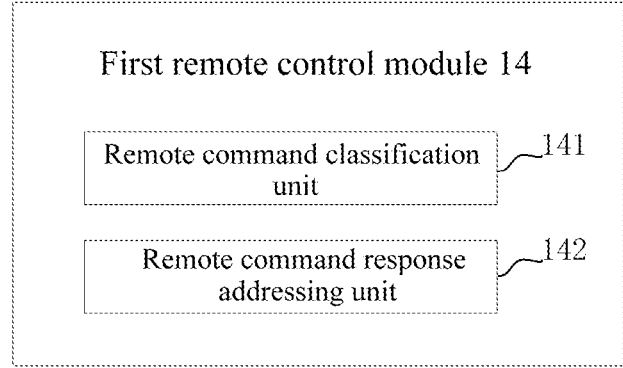
FIG. 7 is a structural block diagram of a first remote control module provided by an embodiment of the present disclosure.

Further, as shown in FIG. 7, the first remote control module 14 includes:
- a remote command classification unit 141 used to classify the received remote control command into in-vehicle control commands and driving commands according to different controls; and
- a remote command response addressing unit 142 used to forward different remote control commands to different control systems of the autonomous vehicle to realize a response to the remote control; forward the in-vehicle control commands to an intelligent cockpit system of the autonomous vehicle; forward the driving commands to the autonomous driving system of the autonomous vehicle.

Figure 8:
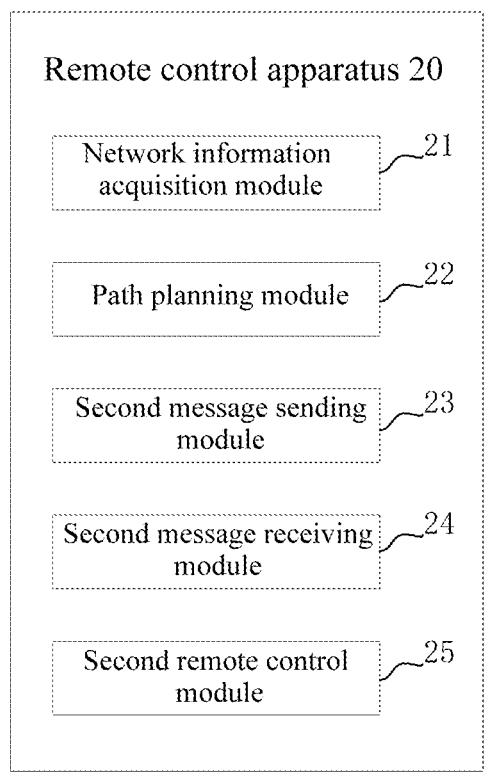
FIG. 8 is a structural block diagram of another autonomous vehicle remote control apparatus provided by an embodiment of the present disclosure.

As shown in FIG. 8, an autonomous vehicle remote control apparatus based on heterogeneous networks provided by an embodiment of the present disclosure is applied to a remote control terminal. The remote control apparatus 20 includes a network information acquisition module 21, a path planning module 22, a second message sending module 23, a second message receiving module 24 and a second remote control module 25, which are specifically as follows:
- the network information acquisition module 21 is used to acquire the available network list in a designated area and a network quality of a corresponding network;
- the path planning module 22 is used to plan an optimal driving path for the autonomous vehicle according to a starting point and an ending point of the autonomous vehicle in a case that the network quality of the area is known, where the network quality on the path supports remote driving as much as possible;
- the second message receiving module 23 is used to receive messages sent by the autonomous vehicle, filter and merge the messages and forward the messages to a second remote control module;
- the second remote control module 24 is used to receive the messages from the second message receiving module and generate a corresponding remote control command according to the information contained in the messages; and
- the second message sending module 25 is used to generate a corresponding message according to the remote control command generated by the second remote control module, and send the message to the autonomous vehicle through a corresponding network in the available network list.

Figure 9:
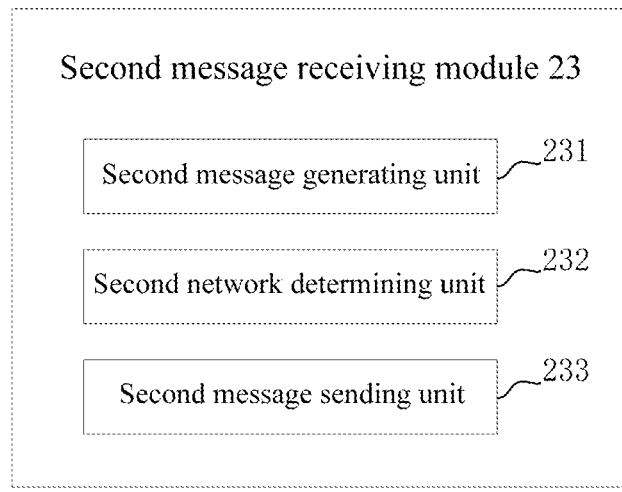
FIG. 9 is a structural block diagram of a second message sending module provided by an embodiment of the present disclosure.

As shown in FIG. 9, the second message sending module 23 includes:
- a second message generating unit 231 used to generate a corresponding message according to the remote control command;
- a second network determining unit 232 used to determine the sending network for the message to be sent according to the type of the message to be sent and the estimated future available network list of the vehicle;
- a second message sending unit 233 used to send the message to be sent through the corresponding sending network, including copying the message.

Figure 10:
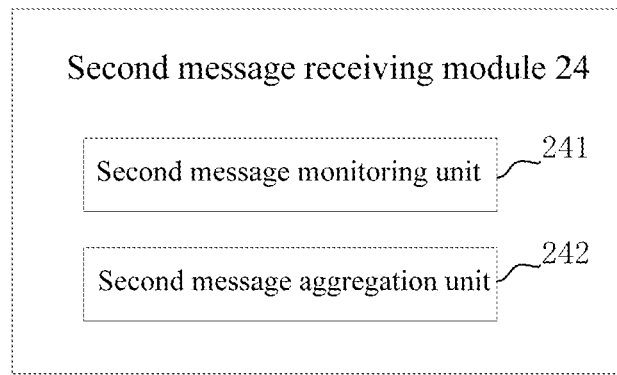
FIG. 10 is a structural block diagram of a second message receiving module provided by an embodiment of the present disclosure.

Further, as shown in FIG. 10, the second message receiving module 24 includes:
- a second message monitoring unit 241 used to monitor the corresponding network port, receive the message sent by the autonomous vehicle, and send the monitored message to the second message aggregation unit;
- a second message aggregation unit 242 used to aggregate the monitored messages and filter and merge the same messages from different networks to obtain effective messages.

It can be understood by those skilled in the art that the above is only a preferred example of the present disclosure, and it is not used to limit the present disclosure. Although the present disclosure has been described in detail with reference to the above examples, it is still possible for those skilled in the art to modify the technical scheme described in the above examples or replace some technical features equally. Any modification and equivalent substitution within the spirit and principle of the present disclosure should be included in the scope of protection of the present disclosure.

What is claimed is:

1. An autonomous vehicle remote control apparatus based on heterogeneous networks, comprising:
   at least one processor, and
   a memory configured to store instructions executable by the at least one processor;
   wherein the instructions cause the at least one processor to:

acquire vehicle state information, vehicle position information, vehicle surrounding environment information provided by vehicle-mounted sensing devices, and an available network list of an autonomous vehicle;

generate a corresponding message according to a state of the autonomous vehicle, and send the corresponding message to a remote control terminal through a corresponding network in the available network list;

monitor different network ports according to the state of the autonomous vehicle, receive remote control messages sent by the remote control terminal, filter and merge the remote control messages, and forward a merged message; and receive the merged message, and respond to a remote control command contained in the merged message to realize remote control of the autonomous vehicle;

acquire the available network list in a designated area and a network quality of a corresponding network;

plan an optimal driving path for the autonomous vehicle according to a starting point and an ending point of the autonomous vehicle in a case that the network quality of the designated area is known, wherein the network quality on the optimal driving path supports remote driving;

receive messages sent by the autonomous vehicle, filter and merge the messages, and forward a merged message;

receive the merged message, and generate a corresponding remote control command according to information contained in the merged message; and generate a corresponding message according to the remote control command, and send the corresponding message to the autonomous vehicle through a corresponding network in the available network list;

wherein the instructions further cause the at least processor to:

classify the received remote control command into in-vehicle control commands and driving commands according to different controls; and forward different remote control commands to different control systems of the autonomous vehicle to realize a response to the remote control; wherein the in-vehicle control commands are forwarded to an intelligent cockpit system of the autonomous vehicle, and the driving commands are forwarded to an autonomous driving system of the autonomous vehicle.

2. The autonomous vehicle remote control apparatus based on heterogeneous networks according to claim 1, wherein instructions further cause the at least processor to:

acquire the vehicle state information from an autonomous driving system of the autonomous vehicle;

acquire current vehicle position information from the autonomous driving system of the autonomous vehicle, and send a corresponding positioning information;

acquire vehicle surrounding environment information from the autonomous driving system of the autonomous vehicle; and acquire the current vehicle position information, and generate and maintain the available network list according to network quality information.

3. The autonomous vehicle remote control apparatus based on heterogeneous networks according to claim 1, wherein instructions further cause the at least processor to:

generate a corresponding message according to a state of the autonomous vehicle;

determine a sending network for the message to be sent according to a type of the message to be sent and the current available network list; and send the message to be sent through the corresponding sending network, wherein a sending process comprises copying and splitting the message to be sent.

4. The autonomous vehicle remote control apparatus based on heterogeneous networks according to claim 1, wherein the instructions further cause the at least processor to:

monitor corresponding network ports in the available network list, and send monitored messages aggregate the monitored messages, filter same messages from different networks to reduce a repeated execution of the remote control command; and process the received remote control messages, extract the corresponding remote control command, and send the remote control command.

5. The autonomous vehicle remote control apparatus based on heterogeneous networks according to claim 2, wherein the instructions further cause the at least processor to search for available networks according to a preset network profile when generating and maintaining the available network list, the preset network profile autonomously saves network information of a last successful access, and gives priority to a network of the last successful access during network search.

6. The autonomous vehicle remote control apparatus based on heterogeneous networks according to claim 3, wherein different sending priorities are set for the vehicle state information, the vehicle position information and the vehicle surrounding environment information, and wherein the vehicle state information has a first priority, the vehicle position information has a second priority, and the vehicle surrounding environment information has a third priority.

7. The autonomous vehicle remote control apparatus based on heterogeneous networks according to claim 1, wherein the instructions further cause the at least processor to:

monitor a corresponding network port, receive messages sent by the autonomous vehicle, and send monitored messages; and aggregate the monitored messages, and filter and merge same messages from different networks to obtain an effective message.

8. The autonomous vehicle remote control apparatus based on heterogeneous networks according to claim 1, further comprising program instruction for:

after the autonomous vehicle is started, searching for available networks and connecting the available networks, selecting an available network as a first network to send and receive information, and receiving a remote driving start message sent by a remote control terminal;

obtaining, by the autonomous vehicle, pre-driving area information comprising path planning information of the autonomous vehicle in a pre-driving area and heterogeneous network information of the pre-driving area sent by the remote control terminal through the first network, autonomously driving according to a planned path, and generating and maintaining an available network list according to the heterogeneous network information;

during driving of the autonomous vehicle, selecting an appropriate network or a network combination to send a vehicle operating message to the remote control terminal, and monitoring remote control messages sent by the remote control terminals on all heterogeneous networks; and after the remote control messages are processed, responding, by the autonomous vehicle, to a remote control command sent by the remote control terminal.

9. The autonomous vehicle remote control apparatus based on heterogeneous networks according to claim 8, wherein the autonomous vehicle obtains network qualities of a driving area from network quality information, sorts qualities of available heterogeneous networks according to the network quality information, and forms sorted networks into an available network list of the autonomous vehicle.

10. The autonomous vehicle remote control apparatus based on heterogeneous networks according to claim 8, wherein before receiving the remote driving start message sent by the remote control terminal, the autonomous vehicle, after being started, actively reports a vehicle start message to the remote control terminal, and wherein the vehicle start message comprises vehicle identification, vehicle state information and vehicle position information.

11. The autonomous vehicle remote control apparatus based on heterogeneous networks according to claim 1, further comprising program instruction for:

sending, by the remote control terminal, a remote driving start message to an autonomous vehicle through a network port by which a vehicle start message is received;

obtaining, by the remote control terminal, heterogeneous network quality information of areas corresponding to a destination and a position of the autonomous vehicle, planning an optimal driving path for the autonomous vehicle, wherein network quality on the optimal driving path supports remote driving, encapsulating path information of a pre-driving area and corresponding heterogeneous network quality information into a pre-driving area message, and sending the pre-driving area message to the autonomous vehicle through a network used by the autonomous vehicle; and receiving, by the remote control terminal, a vehicle operating message sent by the autonomous vehicle, merging received vehicle operating information, extracting complete and effective information, generating a remote control command according to a requirement, encapsulating the remote control command, and generating a remote control message to sent to the autonomous vehicle.

12. The autonomous vehicle remote control apparatus based on heterogeneous networks according to claim 11, wherein the remote control message comprises a remote control message for in-vehicle control and a remote control message for driving;

different priorities for the two types of remote control message are set by the remote control terminal, and a priority of the remote control message for driving is higher than a priority of the remote control message for in-vehicle control.

13. The autonomous vehicle remote control apparatus based on heterogeneous networks according to claim 11, wherein when no remote control command is generated at the remote control terminal for a period of time, a heartbeat remote control command is generated to prove that the remote control terminal is in a normal working state; and the autonomous vehicle does not respond when the autonomous vehicle receives the heartbeat remote control command.

\* \* \* \* \*